United States Patent [19]
Singh et al.

[11] Patent Number: 5,809,524
[45] Date of Patent: Sep. 15, 1998

[54] METHOD AND APPARATUS FOR CACHE MEMORY REPLACEMENT LINE IDENTIFICATION

[75] Inventors: Gurbir Singh; Wen-Hann Wang, both of Portland; Michael W. Rhodehamel, Beaverton; John M. Bauer; Nitin V. Sarangdhar, both of Portland, all of Oreg.

[73] Assignee: Intel Corporation, Santa Clara, Calif.

[21] Appl. No.: 822,044

[22] Filed: Mar. 24, 1997

Related U.S. Application Data

[63] Continuation of Ser. No. 360,332, Dec. 21, 1994, abandoned, which is a continuation-in-part of Ser. No. 176,782, Jan. 4, 1994, abandoned.

[51] Int. Cl.$^6$ .................................................. G06F 12/12
[52] U.S. Cl. ...................... 711/118; 711/133; 711/144; 711/159; 711/168
[58] Field of Search ................................. 395/445, 463, 395/455, 456, 471, 309; 711/118, 128, 129, 136, 144, 133, 134, 159, 160, 168, 167

[56] References Cited

U.S. PATENT DOCUMENTS

| | | | |
|---|---|---|---|
| 4,103,329 | 7/1978 | Davis et al. | 395/375 |
| 5,045,880 | 9/1991 | Evanitsky et al. | 399/82 |
| 5,185,878 | 2/1993 | Baror et al. | 395/450 |
| 5,221,953 | 6/1993 | Higaki | 355/324 |
| 5,243,381 | 9/1993 | Hube | 399/84 |
| 5,301,296 | 4/1994 | Mohri et al. | 395/455 |
| 5,305,056 | 4/1994 | Salgado et al. | 399/11 |
| 5,353,425 | 10/1994 | Malamy et al. | 395/471 |
| 5,432,918 | 7/1995 | Stamm | 395/483 |
| 5,446,850 | 8/1995 | Jeremiah et al. | 395/375 |
| 5,584,003 | 12/1996 | Yamaguchi et al. | 395/403 |
| 5,587,799 | 12/1996 | Kawamura et al. | 358/296 |
| 5,669,040 | 9/1997 | Hisatake | 399/83 |

FOREIGN PATENT DOCUMENTS

| | | |
|---|---|---|
| 56-54455 | 5/1981 | Japan . |
| 59-200270 | 11/1984 | Japan . |
| 5-204207 | 8/1993 | Japan . |

OTHER PUBLICATIONS

Val Popescu, et al., "The Metaflow Architecture", IEEE Micro, Jun. 1991, pp. 10–13 and 63–73.

*Primary Examiner*—Ayaz R. Sheikh
*Assistant Examiner*—Ario Etienne
*Attorney, Agent, or Firm*—Blakely, Sokoloff, Taylor & Zafman

[57] ABSTRACT

A method and apparatus for cache memory replacement line identification have a cache interface which provides a communication interface between a cache memory and a controller for the cache memory. The interface includes an address bus, a data bus, and a status bus. The address bus transfers requested addresses from the controller to the cache memory. The data bus transfers data associated with requested addresses from the controller to the cache memory, and also transfers replacement line addresses from the cache memory to the controller. The status bus transfers status information associated with the requested addresses from the cache memory to the controller which indicate whether the requested addresses are contained in the cache memory. In one embodiment, the data bus also transfers cache line data associated with a requested address from the cache memory to the controller when the requested address hits the cache memory.

16 Claims, 6 Drawing Sheets

METHOD AND APPARATUS FOR CACHE MEMORY REPLACEMENT LINE IDENTIFICATION

RELATED APPLICATIONS

This is a continuation of application Ser. No. 08/360,332 filed Dec. 21, 1994, now abandoned, which is a continuation-in-part application of U.S. patent application Ser. No. 08/176,782, entitled "Method and Apparatus for Controlling Multiple Dice with a Single Die", filed Jan. 4, 1994 now abandoned, and assigned to the corporate assignee of the present invention.

BACKGROUND OF THE INVENTION

1. Field of the Invention

The present invention pertains to the field of computers. More particularly, this invention relates to cache memory systems used in computing systems.

2. Background

Computer technology is continuously advancing, resulting in microprocessors which operate at faster and faster speeds. In order to take full advantage of these higher-speed microprocessors, data storage capabilities must keep up with the increased speed. High-speed memory, however, is very expensive, with the cost being further amplified by the large amount of memory which many modern software programs require.

In addition, portable computing devices are becoming increasingly popular. One major factor in building these portable devices is the size of the overall device. Thus, one manufacturing goal is to provide a large amount of computing power, including processor and memory speed and memory storage, in a small amount of space.

One solution to the problem of expensive memory is that of a cache memory subsystem. A cache memory subsystem is a memory unit which is generally much smaller than the system memory unit but which operates at a significantly higher speed than the system memory. The goal of the cache memory is to contain the information (whether it be data or instructions) that the microprocessor is going to use next. This information can then be returned to the microprocessor much more quickly, due to the higher speed of the cache memory.

The cache memory is typically much smaller than the system memory, thus, only a portion of the memory address is used to determine which location in the cache memory information should be placed in. This portion is referred to as the "index." A second portion of the memory address, generally referred to as the "tag portion," is then used to determine whether subsequent requests for information which match that particular indexed location are for the data currently stored in that location. Therefore, multiple system memory addresses reference the same location in the cache memory.

The operation of cache memory subsystems varies, however, in general data is swapped between the system memory and the cache memory. When the microprocessor requests information from memory, for example, either an instruction it is going to execute or data related to an instruction, it sends the memory address of the desired information to the cache memory. If the cache memory contains the information, it issues a signal to the microprocessor indicating so; this signal is generally termed a "hit." The cache memory then returns the requested information to the microprocessor. Thus, the microprocessor receives the requested information more quickly due to the faster speed of the cache memory.

If, however, the cache memory does not contain the information requested by the microprocessor, then a signal, generally termed a "miss," is returned to the microprocessor. The miss indicates to the microprocessor that it must retrieve the information from the slower system memory. Alternatively, the cache memory controller may retrieve the information from the system memory, and return it to the microprocessor.

Regardless of whether the microprocessor or the cache controller retrieves the information from the system memory, the retrieved information is returned to the microprocessor and is also stored in the cache memory. When the microprocessor requests a memory address which corresponds to a location in the cache memory which is already used by another cache line, then a conflict occurs. In some systems, this situation is resolved by transferring the information stored in a particular location of the cache memory into system memory and transferring the information stored in system memory into that particular location of the cache memory.

Whether the cache memory must transfer the information to the system memory when a conflict occurs is also dependent on the cache policy employed. For example, some cache policies (generally referred to as "write-back" policies), transfer cache lines to the system memory only when a cache line conflict occurs and the cache line has been modified (generally referred to as being "dirty"). If the cache line is not dirty, then the cache line can be overwritten with new data without fear of losing modified data.

In the event of a cache miss and a cache line conflict, a victim, or replacement, line must be determined. The victim line is the line in the cache memory which will be transferred to the main system memory to provide space in the cache memory for the incoming cache line. The cache memory identifies this victim line to the cache controller, generally by address, thereby informing the cache controller where to place the incoming cache line.

One method of identifying the victim line to the cache controller is by means of a separate victim address bus. This victim address bus is an additional set of address lines between the cache memory and the cache controller via which the cache memory transfers the victim line address. This method is problematical, however, due to the additional physical space necessary to include the victim address bus.

Another method of identifying the victim line to the cache controller is to utilize a bi-directional address bus between the cache memory and the cache controller. The bi-directional address bus allows the cache controller to transfer the addresses of requests to the cache memory, and the cache memory to transfer victim line addresses to the cache controller. This method is problematical, however, due to bus contention problems on the bi-directional address bus. That is, this method must resolve the situation of both the cache controller and cache memory attempting to transfer addresses at the same time. Such bi-directional buses frequently require a dead clock cycle when switching directions to minimize electrical contention.

Thus, it would be beneficial to provide a method of efficiently using a cache memory interface to identify victim cache lines.

It would further be beneficial to provide a cache memory interface which reduces the physical space required to implement the interface.

The present invention provides for these and other advantageous results.

SUMMARY OF THE INVENTION

A method and apparatus for cache memory replacement line identification is described herein. A cache interface provides a communication interface between a cache memory and a controller for the cache memory. The interface includes an address bus, a data bus, and a status bus. The address bus transfers requested addresses from the controller to the cache memory. The data bus transfers data associated with requested addresses from the controller to the cache memory, and also transfers replacement line addresses from the cache memory to the controller. The status bus transfers status information associated with the requested addresses from the cache memory to the controller which indicate whether the requested addresses are contained in the cache memory. In one embodiment, the data bus also transfers cache line data associated with a requested address from the cache memory to the controller when the requested address hits the cache memory.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances, well known methods, procedures, components, and circuits have not been described in detail so as not to obscure aspects of the present invention. It should be noted that the present invention can be applied to a variety of different processor architectures. Furthermore, the present invention can be practiced in a variety of manners, such as by a single or multiple chip implementation or by fabrication by silicon or gallium arsenide or other processes.

One Embodiment of the Cache Memory Subsystem

Figure 1:
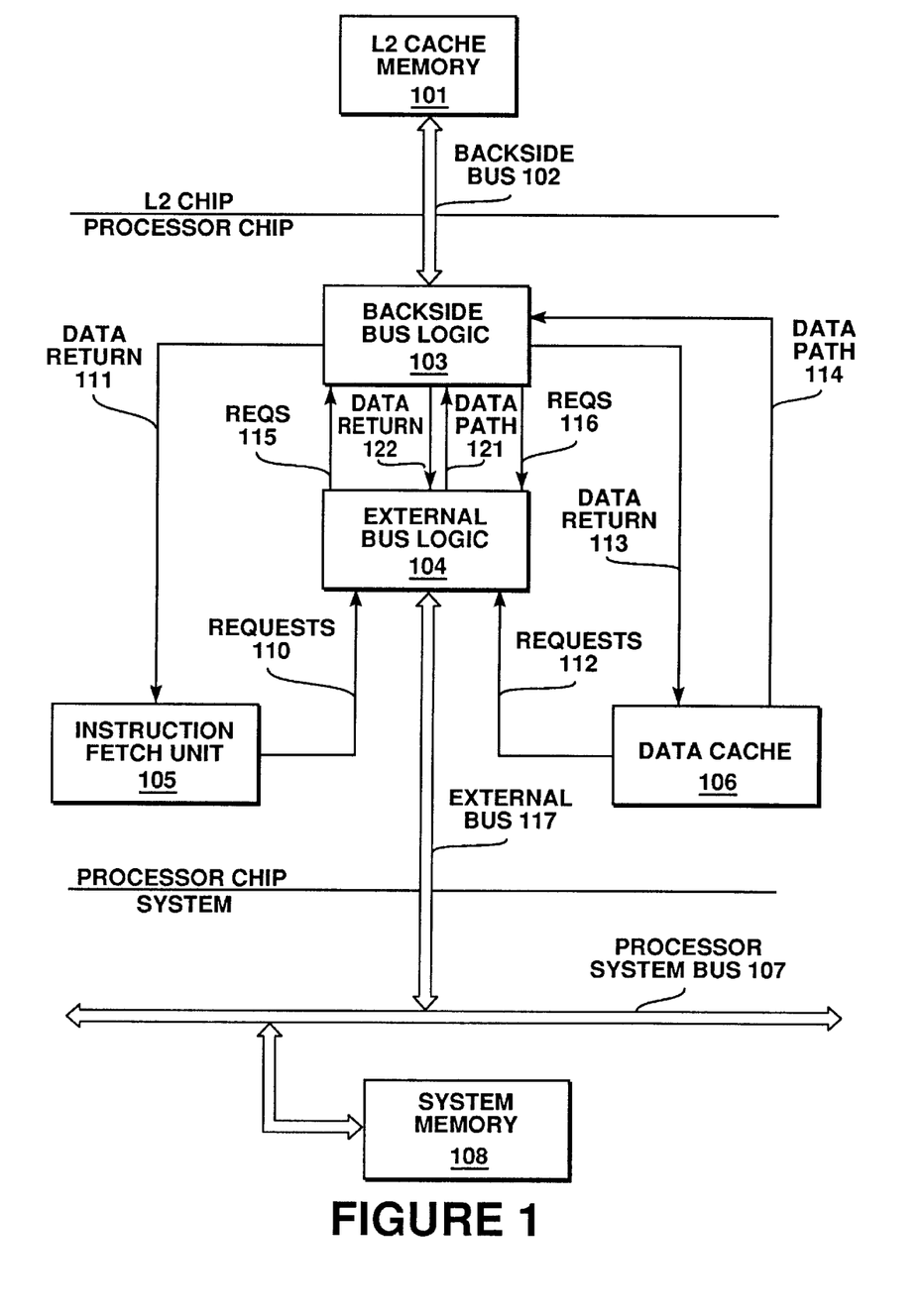
FIG. 1 is a block diagram of a memory subsystem of a computer system in one embodiment of the present invention.

FIG. 1 is a block diagram of a memory subsystem of the computer system in one embodiment of the present invention. Boundary lines are shown to define the portion of the memory subsystem that is contained within the processor and that portion which is external to the processor. In one embodiment, the memory subsystem shown in FIG. 1 utilizes the well-known Modified, Exclusive, Shared, Invalid (MESI) cache coherency protocol, described in more detail below. Referring to FIG. 1, an L2 cache memory 101 is coupled to a backside bus 102. Backside bus 102 is also coupled to backside bus logic (BBL) 103. Backside bus logic 103 is also coupled to external bus logic (EBL) 104, instruction fetch unit (IFU) 105 and data cache unit (DCU) 106. External bus logic 104 is also coupled to instruction fetch unit 105, data cache 106 and system bus 107. Also shown coupled to system bus 107 is system memory 108.

Instruction fetch unit 105 includes instruction fetch logic and the instruction cache and fetches instructions for execution in the processor. When the instruction cache of IFU 105 desires to fetch more instructions, it sends a request on signal path 110 to external bus logic 104. The external bus logic 104 sends the request on request lines 115 to backside bus logic 103 which forwards the request to the L2 cache memory 101. In response, the L2 cache memory 101 performs a read operation. If there is a hit in L2 cache memory 101, the instructions are returned to instruction fetch unit 105 on the data return signal path 111 from backside bus logic 103 and backside bus 102.

The DCU 106 holds temporary copies of data for use by the processor in executing the instructions. In one embodiment, DCU 106 comprises an L1 cache memory. In executing instructions, if the data is not in the DCU 106 (that is, the L1 cache), a request is made on request signal path 112 to external bus logic 104. External bus logic 104 sends a request on request lines 115 to backside bus logic 103 which forwards the request on to L2 cache memory 101. If the data is in L2 cache memory 101 (that is, if L2 cache memory 101 hits), then the data is forwarded and returned to DCU 106 on data return signal path 113. When data is written back from DCU 106 or if there is no longer room in DCU 106, data is sent out to backside bus 102 via backside bus logic 103 to L2 cache memory 101.

Any time data from L2 cache memory 101 is to be written back to system memory 108, a request is made to external bus logic 104 via request lines 116 from backside bus logic 103. The data is written from backside bus 102 through backside bus logic 103 to external bus logic 104 via data return 122. External bus logic 104 controls the data by writing the data on external bus 117 to system memory 108 via system bus 107. Any time there is a miss to L2 cache memory 101, external bus logic 104 sends the request to system memory 108 using external bus 117 and system bus 107. The data returned is received by external bus logic 104 and sent to backside bus logic 103 via data path 121 for storage in L2 cache memory 101. The data is then written to DCU 106 via data return lines 113 and to L2 cache memory 101 via backside bus 102.

Processor accesses from the instruction fetch unit 105 are always fetch operations with no intent to modify the data. Similarly read operations from the data cache 106 that are generated by the processor executing a read operation are always data fetch operations. These requests are forwarded to system bus 107, if they miss L2 cache memory 101, as read operations from the memory. When the data is returned by system memory 108, a signal on system bus 107 indicates if copies of this data also exist in other cache memories in a multiple processor system. If they do, then the data is placed in L2 cache memory 101 and data cache memory 106 and marked with a state of Shared (S). On the other hand, if no other cache memory has a copy of the data as indicated on system bus 107, the data can be placed in L2 cache memory 101 and data cache memory 106 and marked Exclusive (E). In one embodiment of the present invention, instructions which are returned by system memory 108 are placed in L2 cache memory 101 and the instruction cache of IFU 105 and marked with a state of Shared (S).

Whenever the processor intends to modify data, it issues a request to data cache memory 106 to obtain a copy of the data with complete ownership. If the data is not present in data cache memory 106, a similar request is sent to L2 cache memory 101. If the request also misses L2 cache memory 101, it is then forwarded to system bus 107 as a data read request with a command modifier indicating to all other processors on system bus 107 that they must relinquish ownership of this cache line of data and invalidate all copies of the line in their cache memories. The data is then returned to the requesting processor granting it exclusive ownership and is placed in L2 cache memory 101 and data cache memory 106 in the Modified (M) state. The processor is then free to update any portion of the cache line it chooses. This results in a write command being issued to data cache memory 106 with the modified data and data cache memory 106 updates its copy of the cache line to reflect the change. If the processor chooses to modify the data in that cache line yet again, it can do so within data cache memory 106 without issuing further requests to L2 cache memory 101 and system bus 107.

In one embodiment of the present invention, L2 cache memory 101 and the data cache 106 and IFU cache 105 memories do not rely on any particular inclusion properties. That is, a cache line may be valid in L2 cache memory 101 and may not be valid in either the data cache memory 106 or the instruction cache of the IFU 105. In an alternate embodiment, the processor may follow a protocol by which the state of a cache line in data cache memory 106 is always lower than or equal to the state of the same cache line in L2 cache memory 101, wherein, for example, the hierarchy for a MESI based cache coherency is Modified, Exclusive, Shared, and then Invalid (listed from highest priority to lowest). This is referred to herein as a "dirty" or "modified" inclusion. Implementing such a priority, the processor would be able to determine that if the cache line in data cache memory 106 is shown to be Modified, then the processor knows that the state of the same cache line in L2 cache memory 101 was changed to Modified upon the change in state in data cache memory 106 and that L2 cache memory 101 still reflects such a state for the cache line. In another embodiment, if a subsequent change to the same cache line is to occur, the processor could request the state of the cache line as currently indicated by L2 cache memory 101. Upon seeing that the state is Modified, the processor knows that the data in data cache memory 106 may be changed. Another mechanism by which the processor is able to identify whether a change in state needs to be made to a cache line in L2 cache memory 101 upon the occurrence of a subsequent write to the same cache line in data cache memory 106 is to include a "more modified" indication (e.g., a bit location) for the cache line in data cache memory 106 that indicates when the data in data cache memory 106 has been subsequently modified. In such an implementation, when such "more modified" data is to be written back to the system bus (main memory), then the processor is able to determine which data should be written, specifically whether the data in L2 cache memory 101 suffices or only the data in data cache memory 106 will do.

Several variations of this scenario can exist regarding modifications to data in the cache memories. For example, the data the processor intends to modify could be in data cache memory 106 or L2 cache memory 101, or both, because of a previous data fetch transaction. However, the data is marked Shared (S) indicating that although the cache memory has the latest copy of the data, other cache memories in the system also have copies of it. Under such a circumstance, data cache memory 106 or L2 cache memory 101 must make a request on system bus 107 requesting ownership of the line but not necessarily perform a data fetch operation. This request causes all other cache memories in the system to mark their copies of the cache line as Invalid (I), granting exclusive ownership of the cache line to the requesting processor. This operation needs to be performed in order to ensure that no more than one processor at a time attempts to modify the data in a cache line at a time.

If two processors were to attempt to do so, then the request for ownership for the cache line from one of them will reach system bus 107 before the other and it will get the opportunity to make its modifications to the cached data first. The integration of the control for L2 cache memory 101 into the processor permits considerable optimization of the control logic of these complex operations. Moreover, the interaction between sequential transactions targeted at the same cache line can now be resolved optimally without holding them up and waiting for the entire previous transaction to complete. To this end, multiple operations may be merged into a single transaction by the processor. This has a dramatic effect upon the performance of multiple processor systems that are sharing the same data out of the system memory 108.

By integrating the control for L2 cache memory 101 into the processor, the present invention is able to better coordinate the activities and transactions that occur in the computer system. The single control of the processor is functionally positioned with respect to data cache memory 106, L2 cache memory 101 and the external bus to allow the controller to obtain information and respond, if necessary, to any transaction on the three ports (data cache memory 106, L2 cache memory 101 and the external bus) that is currently in progress. The controller of the present invention can merge transactions sourced from one or more of data cache memory 106, L2 cache memory 101 and the external bus into a single transaction directed to the processor core or a port.

For example, if the processor core desires to modify a cache line in data cache memory 106 which is marked as Exclusive (E) in data cache memory 106 and L2 cache memory 101, when the data is modified in data cache memory 106, L2 cache memory 101 must be set -to Modified (M) (if following the protocol discussed above). Then, if there is no Modified state written into L2 cache memory 101, a later modification to different data in the same cache line occurs, and the cache line is to be evicted from data cache memory 106, then the state must be changed to Modified (M) in L2 cache memory 101 and L2 cache memory 101 must be updated with the modified data. The controller of the present invention is able to merge the operations into a single operation. In a similar fashion, the controller of the present invention is able to recognize conflicts between transactions with the processor core and L2 cache memory 101 and merge the transactions, such that multiple transactions, as a whole, are optimized into fewer operations, when possible.

One Embodiment of the Backside Bus Logic

Figure 2:
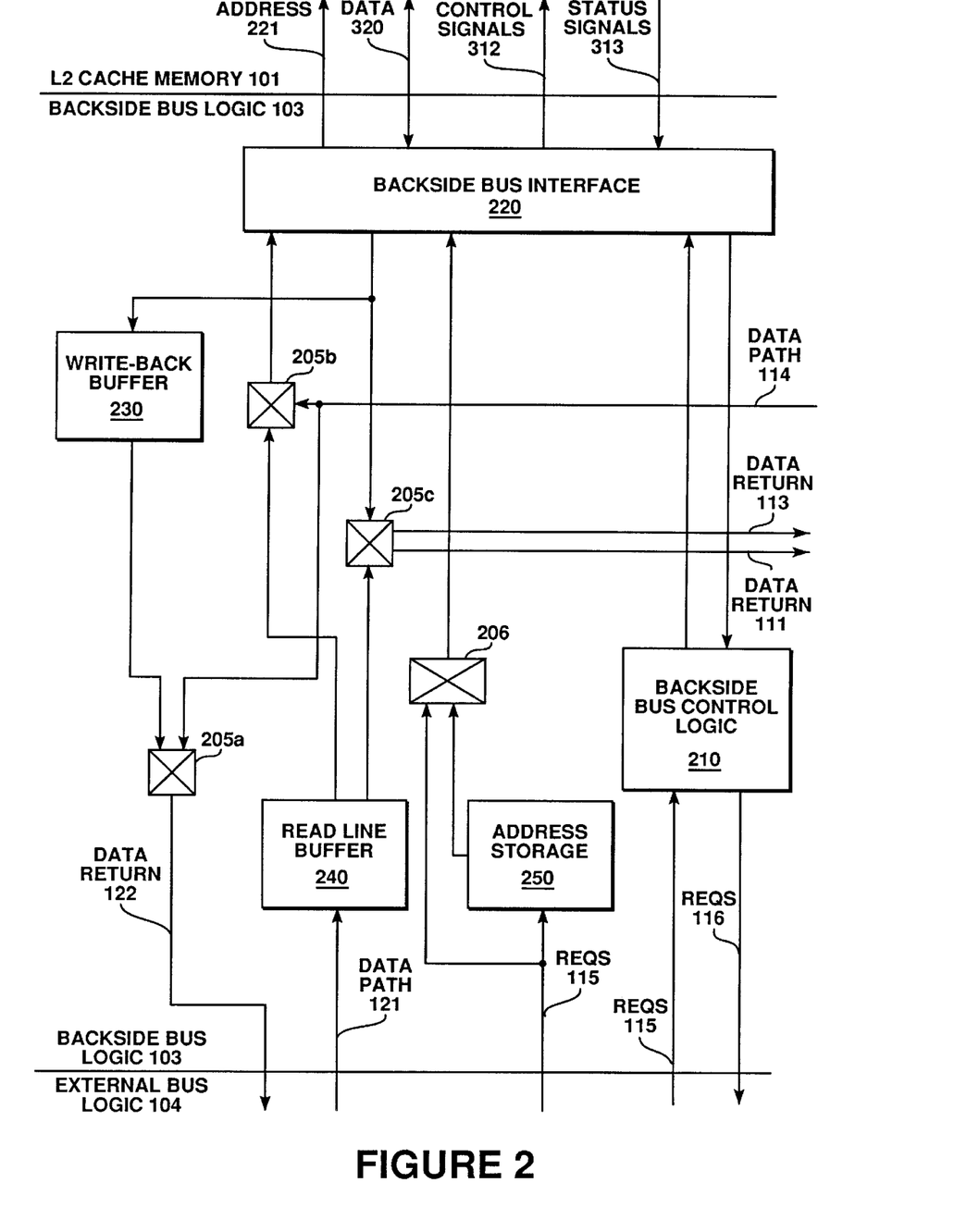
FIG. 2 is a block diagram showing backside bus logic of a memory subsystem in one embodiment of the present invention.

FIG. 2 is a block diagram showing one embodiment of backside bus logic 103 of FIG. 1 in more detail. BBL 103 includes backside bus control logic 210, backside bus interface 220, write-back buffer 230, read line buffer 240, and address storage 250. BBL 103 also includes multiple data multiplexers 205a, 205b, and 205c to route data between L2 cache memory 101, EBL 104, IFU 105, and DCU 106. Data can be routed to and from certain combinations of these units, depending on the action needed. BBL 103 also includes address multiplexer 206 which allows addresses to be transferred to L2 cache memory 101 either directly or via address storage 250.

Backside bus control logic 210 processes requests for L2 information received from EBL 104, and determines which L2 micro-operations are needed to carry out the desired action. These L2 micro-operations are discussed in more detail below.

Backside bus interface 220 provides an interface between BBL 103 and L2 cache memory 101. Backside bus interface 220 includes the latches and necessary circuitry for interfacing between BBL 103 and L2 cache memory 101.

Read line buffer 240 buffers data arriving from the external bus for return to IFU 105, DCU 106, or L2 cache memory 101 via data path 121. In one embodiment of the present invention, read line buffer 240 contains buffering space for four cache lines. External bus logic 104 keeps track of read line buffer 240 allocations through its own status bits, and is responsible for scheduling return of the data in read line buffer 240 to IFU 105, DCU 106, and L2 cache memory 101. In one embodiment of the present invention, external bus logic 104 requests backside bus control logic 210 to write the read line buffer 240 contents back into L2 cache memory 101 once all outstanding chunks of data have returned from system memory 108.

Write-back buffer 230 stores dirty line(s) caused by L2 cache line victimization. The cache lines stored in write-back buffer 230 are destined for external memory writes and are returned to EBL 104 via data return lines 122. BBL 103 requests the cache lines stored in write-back buffer 230 to be returned to system memory 108 by issuing a request to EBL 104 via request lines 116. In one embodiment of the present invention, write-back buffer 230 contains storage space for two cache lines. In an alternate embodiment, write-back buffer 230 may contain storage space for additional cache lines or only a single cache line.

In one embodiment of the present invention, when an L2 cache miss occurs, the victim line address is returned to EBL 104 from L2 cache memory 101, via BBL 103, and the address is stored in an address register within the EBL 104. In addition, if the victim line is dirty, then the victim cache line is retrieved from L2 cache memory 101 by BBL 103 and is stored in write-back buffer 230. In one implementation, each victimized line address stored in the address registers of EBL 104 is identified by a unique identification value, with the same-unique value being used to identify entries in write-back buffer 230. Thus, EBL 104 can readily determine which address in the address registers corresponds to which data in write-back buffer 230.

In one embodiment of the present invention, when a victimized cache line is transferred to write-back buffer 230, backside bus control logic 210 checks whether DCU 106 contains a modified cache line for the same address. If such a line does exist in DCU 106, then the cache line in DCU 106 will be more recently modified than the cache line in L2 cache memory 101. In one implementation, the cache line from DCU 106 is transferred to write-back buffer 230 for the writeback to system memory 108, overwriting the victimized cache line from L2 cache memory 101. In an alternate implementation, the writeback transaction is terminated. Thus the cache line is not written back to memory because DCU 106 contains the most recently modified version of the cache line.

The addresses of requests are transferred from backside bus interface 220 to L2 cache memory 101 via backside address bus 221. In one embodiment of the present invention, backside address bus 221 is a uni-directional bus; that is, L2 cache memory 101 does not transfer information to BBL 103 via backside address bus 221. Therefore, no contention for the backside address bus 221 will occur. Thus, BBL 103 is able to continuously issue requests from the processor to L2 cache memory 101 (e.g., pipeline requests) without concern for contention on the backside address bus.

Backside bus control logic 210 receives requests from external bus logic 104 via request lines 115. Additional control lines (not shown) also couple together the various components within BBL 103. For example, control lines connect backside bus control logic 210 and multiplexers 205a, 205b, 205c and 206. These additional control lines have not been shown so as not to clutter the drawings and obscure the present invention. The necessary connections for these control lines will be apparent from the descriptions herein.

In one embodiment of the present invention, BBL 103 also includes address storage unit 250. Address storage unit 250 stores request addresses received from EBL 104 via request lines 115. These addresses may correspond, for example, to the data stored in read line buffer 240. Thus, when data is transferred into read line buffer 240, the corresponding address is transferred into address storage 250. In one implementation of the present invention, an identification value is stored with the address in address storage 250 and the data in read line buffer 240. In this implementation, control logic 210 can determine which data in read line buffer 240 matches which address in address storage 250 by comparing these identification values.

One Embodiment of the L2 Cache Memory

Figure 3:
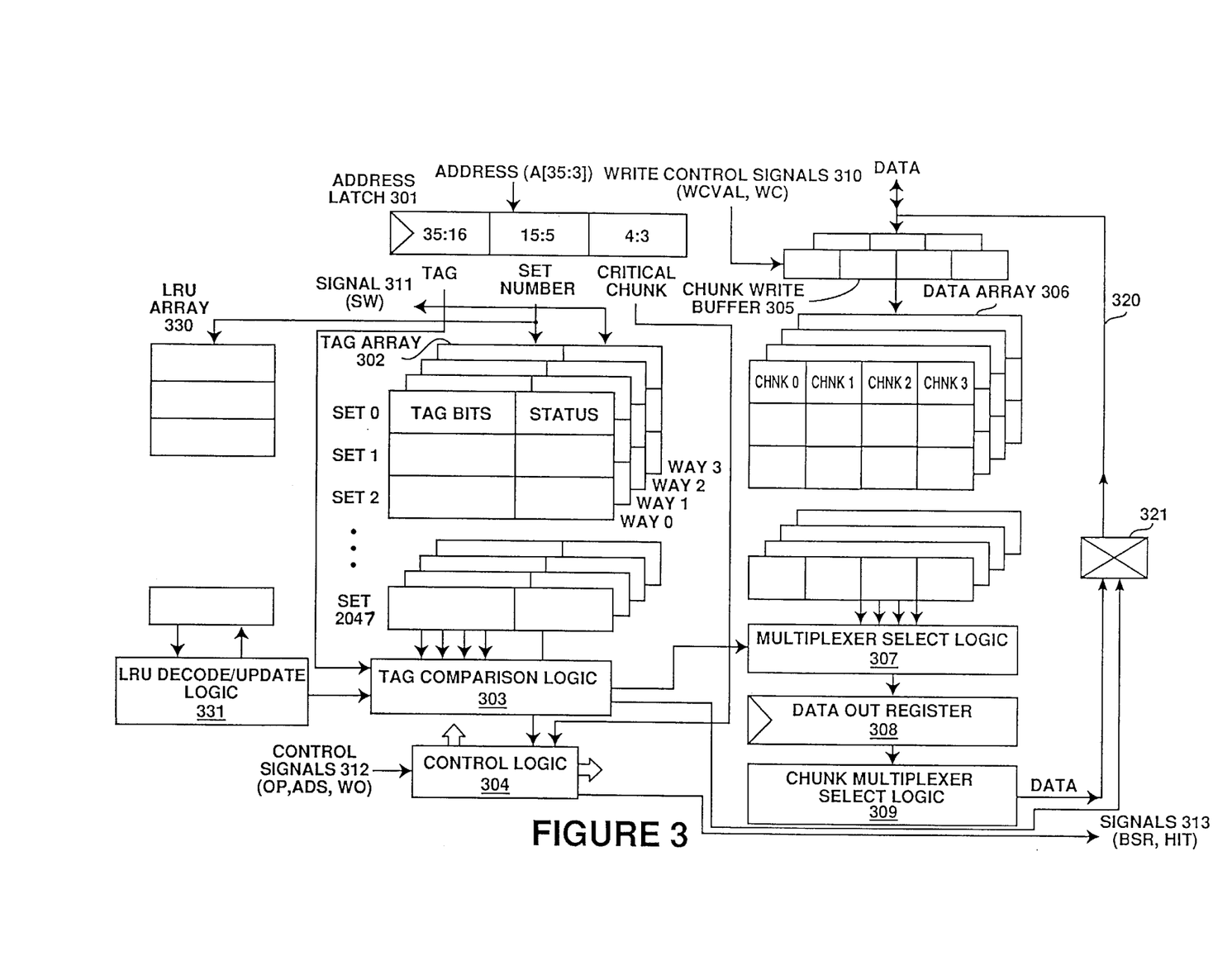
FIG. 3 is a block diagram of one embodiment of the L2 cache memory of the present invention.

FIG. 3 shows a block diagram of L2 cache memory 101 in one embodiment of the present invention. Referring to FIG. 3, L2 cache memory 101 includes address latch 301, tag array 302, tag comparison logic 303, control logic 304, chunk write buffer 305, data array 306, multiplexer (MUX) select 307, data output register 308, chunk MUX select logic 309, least recently used (LRU) array 330, and LRU decode/update logic 331. Control logic 304 is coupled to components in L2 cache memory 101 to control their operation, partially in response to control signals 312 received on its inputs and signals by L2 cache memory 101. Control logic 304 also provides signals 313 to the processor.

The address latch 301 receives an address from backside address bus 221. Bits [15:5] of the address select one of the sets in the tag array 302. The contents of the set are compared with bits [35:16] of the address in the comparison logic 303 and the result is used to select the appropriate way in the multiplexer select logic 307. Bits [4:3] of the address select which chunk of the data gets sent to the data bus 320, via the chunk multiplexer logic 309. The status signals from the tag array 302 are also returned to the processor via signals 313 and control logic 304.

In one embodiment, cache memory 101 is a 256 Kbyte four-way set associative cache, such that tag array 302 includes four separate ways (shown as way 0-3). In one implementation, tag array 302 includes 2048 sets, labeled set 0 to set 2047. In an alternate embodiment, cache memory 101 is a 512 Kbyte four-way set associative cache. In this alternate embodiment, tag array 302 includes 4096 sets, bits [16:5] of the address in address latch 201 select one of the sets in the tag array 302, and the contents of the set are compared with bits [35:17] of the address in the comparison logic 303.

Each set location in each way includes tag bits and status bits and additional parity bits. Two additional parity bits are included. The size of the tag is dependent on the size of the L2 cache memory. The status bits reflect the state of the L2 cache memory line: Modified, Exclusive, Share, or Invalid (MESI). These states are well-known to those skilled in the art.

It should be noted that the L2 cache memory regards the Modified/Exclusive/Shared states as valid, and does not distinguish between any of the valid states. In one embodiment of the present invention, the processor distinguishes between the valid states and, thus, implements the cache coherency protocol. That is, the processor of the present invention directly controls the status (MESI) of the stored data lines within the L2 cache memory, and the target associative way information on line writes.

Each set of four tags corresponding to the cache lines in all four ways in the tag array contains one LRU field in LRU array 330 for determining the victim line during a read miss.

Bits [15:5] of the address also select one of the LRU fields in LRU array 330, concurrent with the selection of one of the sets in the tag array 302. The set information selects a field within LRU array 330 which corresponds to the same set in tag array 302 and data array 306. The contents of the field in LRU array 330 are then input to LRU decode/update logic 331. LRU decode/update logic 331 determines which cache line in the selected set is to be victimized. Each field within LRU array 330 includes an indication of a particular way within the corresponding set of tag array 302 which is the LRU way. The cache line addressed by this LRU way is the cache line which is to be victimized (that is, replaced). It should be noted that LRU decode/update logic 331 makes this determination for every address latched into address latch 301 and outputs the result to tag comparison logic 303.

In one embodiment of the present invention, LRU decode/update logic 331 implements a pseudo-LRU algorithm for its line replacement policy encoded in three bits, LRU[2:0]. In this embodiment, each set contains four ways, one of which is the LRU way. These four ways are divided into two 2-way subsets, with one bit indicating which subset is the least recently used subset. An additional bit is utilized for each subset, indicating which way is the least recently used way within the subset. For example, LRU[0] indicates which of the two subsets is the LRU subset, LRU[1] indicates the LRU way in subset 0, and LRU[2] indicates the LRU way in subset 1. Table 1 shows which way is the LRU way based on the LRU[2:0] bits in this example.

TABLE 1

| LRU[0] | LRU[1] | LRU[2] | LRU Way |
|---|---|---|---|
| 0 | 0 | x | Way 0 |
| 0 | 1 | x | Way 1 |
| 1 | x | 0 | Way 2 |
| 1 | x | 1 | Way 3 |

Note:
An entry of "x" indicates the value of the bit can be either 0 or 1.

LRU decode/update logic 331 updates the selected field of LRU array 330 based on the way indicated by a micro-operation received from backside bus logic 103. In one embodiment, these micro-operations, discussed in more detail below, which could cause L2 cache memory 101 to update LRU array 330 are: L2 Read Inquire, Tag Inquire Update, and Write Line Update. In one embodiment, LRU decode/update logic 331 updates LRU array 330 in two situations. First, if an L2 Read Inquire or Tag Inquire Update operation results in a cache hit, then the LRU array 330 is updated based on the set and way which contains the requested cache line (that is, the cache line which was hit). In this situation, the way indicated by the operation is the way which contains the requested cache line. Second, when L2 cache memory 101 receives a Write Line Update operation, LRU array 330 updates the field based on the set and way information included with the operation.

Table 2 shows the LRU field state transitions for updating the selected LRU field in one embodiment of the present invention, based on the way indicated by the operation.

TABLE 2

| Indicated Way | LRU[0] | LRU[1] | LRU[2] |
|---|---|---|---|
| 0 | 1 | 1 | unchanged |
| 1 | 1 | 0 | unchanged |
| 2 | 0 | unchanged | 1 |
| 3 | 0 | unchanged | 0 |

The L2 cache memory supports data integrity through parity. The data integrity is intended to cover transmission errors on the backside bus and storage errors in tag array 302 and data array 306.

In one embodiment, data array 306 is a 288 Kbyte, 4-way set associative static random access memory (SRAM) that is logically organized as a 4×2K×288. The 288 bit word length is comprised of four 72 bit wide chunks, where each chunk contains 64 data bits plus 8 ECC bits. In an alternate embodiment, data array 306 is a 576 Kbyte, 4-way set associative SRAM that is logically organized as a 4×4K× 288.

The L2 cache memory allows pipelined read accesses for producing a "seamless data" stream along with mechanisms to allow data line read capability and tag array access capability. If a memory request is made to the L2 cache memory, a read operation occurs. During a read operation to the L2 cache memory, an address is driven on the address bus portion of the backside bus. The address represents a portion of the memory request. The address is latched into address latch 301. The set number portion of the address from bits [15:5] in address latch 301 is used to select a set in the four separate ways. The tag bits for the set in each of the ways are sent to tag comparison logic 303 with, the tag bit portion of the address from bits [35:16] in address latch 301. Thus, the memory request is compared with the tag entry at the page location in each of the ways to determine if the information is in the cache. In the embodiment shown, since there are four ways, there are four separate comparisons made. These comparisons occur in parallel to determine if the information requested is stored in the cache.

If one of the tags matches the tag from the address, then there is a hit. If the results of the comparison determine there is a hit, the tag comparison logic 303 outputs a signal to MUX select logic 307 causing MUX select logic 307 to select the page and corresponding cache line in data array 306. The cache line data selected is output to the data output register 308 which latches the data for output onto the data bus portion 320 of the backside bus. Using the critical chunk portion of the address from bits [4:3] in address latch 301, the chunk MUX selection logic 309 selects the desired chunk of data for output onto data bus 320, which is output to the processor. In one embodiment, the L2 cache memory transfers a 32-byte cache line in burst fashion in four chunks, with the critical chunk first. In the event of a hit, control logic 304 issues a signal to MUX 321, which allows selection logic 309 to place the cache line onto data bus portion 320.

On the other hand, if none of the tags from tag array 302 match the tag portion of the address of the memory request, then there is a miss, which is indicated to the processor by control logic 304 using one of the signals 313. Tag comparison logic 303 also receives the LRU way information from LRU decode/update logic 331. Tag comparison logic 303 forwards the full line address (that is, the tag and set) of the LRU way to MUX 321. When tag comparison logic 303 indicates to control logic 304 that a miss occurred, control logic 304 issues a signal to MUX 321 to allow the line address received from tag comparison logic 303 onto data bus portion 320. Thus, BBL 103 receives the miss indication via signals 313 and the replacement line identification via data bus portion 320.

In one embodiment of the present invention, control logic 304 issues a miss indication via signals 313 to BBL 103 in the same clock cycle as the victim line address is placed onto data bus portion 320 via MUX 321. Thus, BBL 103 receives the miss indication and the victim line address in the same clock cycle. In one implementation, data bus portion 320 is a 64-bit bus, thereby allowing the full line address of the victimized cache line to be transferred in a single clock cycle.

When data is being written into the L2 cache memory due to the L1 cache of the processor writing data back to the L2 cache memory or due to information from system memory being input into the processor, a cache line is sent to the L2 cache memory. In one embodiment, the cache line is 32-bytes. The data is received by chunk write buffer 305 from data bus 320. Since data bus 320 is only 8-bytes wide and the cache line in 32-bytes wide, the data is received into the chunk write buffer one chunk at a time. The write control signals 310 cause the data from data bus 320 to be directed to its designated chunk location in chunk write buffer 305. Once chunk write buffer 305 is filled, write control signals 310 cause the data to be transferred from chunk write buffer 305 into data array 306.

Controlling the L2 Cache Memory

The processor of the present invention controls the functionality of the L2 cache memory, such that the L2 cache memory is a slave on the backside bus. That is, the control of the L2 cache memory is partitioned between the processor and the L2 cache memory in such a way that the processor of the present invention controls and knows what the L2 cache memory is doing (for example, whether the L2 cache memory is transferring data). In one embodiment of the present invention, the processor controls the L2 cache memory using opcodes sent by the processor to the L2 cache memory.

The processor controls the L2 cache memory behavior through micro-operations which provide the functionality needed for all processor micro-operations requiring the L2 cache memory. In one embodiment, these micro-operations are used to perform all write operations to the L2 cache memory. Also, the processor uses these micro-operations to maintain the cache consistency. These micro-operations function within the confines of the interface provided between the processor and the L2 cache memory in order to implement single die control in a multi-die package. A brief description of each micro-operation performed by the L2 cache memory is given below.

L2 Read Inquire

The processor uses this micro-operation to read an entire line from L2 cache memory if the line is resident in the L2 cache memory. The processor sends a complete address to the L2 cache memory. The L2 cache memory examines the specified set number to see if it has the specified tag. The L2 cache memory signals a hit to the processor if a tag match is found and the status of the line is modified, exclusive, or shared. On a hit, the L2 cache memory updates the appropriate LRU field and returns the way information, the value of the status, and the data line in a burst fashion over four cycles to the processor. If the tag did not match, the L2 cache memory returns the way information, status and full line address (tag and set) of the cache line to be replaced. If a miss occurred, the LRU field is not updated, but will be updated when the replacement line is written using the Write Line Update micro-operation.

State Write

The processor may change the status of any given line in the L2 cache memory with this micro-operation. The processor indicates the set address, the way, and the status value to be stored. No tag matching is done on the address and the L2 cache memory LRU field is not modified.

State Read

The processor reads the status of any given line in the L2 cache memory with this micro-operation. The processor indicates the set address and the way to be read. The L2 cache memory returns the status of the specified line. No tag matching is done on the address and the L2 cache memory LRU field is not modified. This operation may be used for testing purposes.

Tag Inquire

This operation prompts the L2 cache memory to determine if it contains a given line. The L2 cache memory examines the specified set number to determine if it has the specified tag. The L2 cache memory then signals a hit to the processor if a tag match is found and the status of the line is something other than invalid (an illegal status encoding will all signal a hit, but will also cause a BERR). The L2 cache memory data array is not accessed and the L2 cache memory LRU field is not modified. This operation may be used in response to a request from a device on the external bus made to determine if data that is desired is currently stored in the cache memory.

Tag Inquire Update

This micro-operation is identical to Tag Inquire, except that the LRU field is updated upon a match.

Tag Array Read

This micro-operation is used to read an entry in the tag array without accessing the data array. The processor provides the set address and the way information. The L2 cache memory returns the tag status and the full address. The address is returned over the data lines using the natural alignment of the tag. This scheme avoids bi-directionality on the address lines.. The L2 cache memory LRU field is not modified.

Data Array Read

This micro-operation is used to read an entry in the data array without accessing the tag array. The processor provides the set address and the way information. The data line is sent back in a burst fashion over a four cycle burst. The L2 cache memory LRU field is not modified. This operation may be used to test the array and to read victimized cache line data for writing back to the system memory.

Write Chunk

The processor uses this micro-operation to load a data chunk into the Chunk Write Buffer on the L2 cache memory chip by specifying the chunk number, driving a data word onto the data bus, and signaling the L2 cache memory to write the chunk. This micro-operation can occur independently of any other L2 cache memory operation not involving the data bus. It is the responsibility of the processor to prevent data bus collisions when issuing Write Chunk micro-operations. No data array or tag array accesses are made during this operation and the LRU field is not modified. This operation is used to write a single chunk into the L2 Chunk Write Buffer, which, at a later time, transfers the contents of the Chunk Write Buffer to the L2 cache memory.

Write Line

This micro-operation is used as the final step in writing an entire line into the L2 cache memory. The line to be written is first stored in the L2 cache memory Chunk Write Buffer using the Write chunk micro-operation described above. The processor then uses the Write Line micro-operation along with specifying the tag and set address, the way information, and the status of the line to be written. The entire line contained in the Chunk Write Buffer is then written into the L2 cache memory data array. The tag and the status are written into the tag array and status array, respectively. The Write Line micro-operation may be issued concurrently with the last of the four Write Chunk commands. The LRU field is not modified with this micro-operation.

Write Line Update

This micro-operation is identical to the Write Line with the addition that the LRU field is updated.

The processor sends these micro-operations to the control logic of the L2 cache memory which decodes the micro-operations to control the sequence of outputs and to provide data integrity. The decoding performed produces signals that initiate access cycles. The control block of the L2 cache memory also performs output control. The control logic also includes logic for performing data integrity operations.

The micro-operations operate on the L2 cache memory using the interface provided by the backside bus. One embodiment of the backside bus provides the following L2 cache memory external interface:

| NAME | CLASS | I/O | DESCRIPTION |
|---|---|---|---|
| A[35:3] | Processor Addr | Input | Physical Address presented by the processor to the L2 cache memory. The Address field is only valid when ADS is asserted. For several of the L2 cache memory operations, only subfields of the address field are examined. |
| D[63:0] | Processor Data | IOput | Data is transferred to and from the L2 cache memory over this bidirectional bus. A dead clock is needed to prevent bus contention during direction switching. During certain operations, this bus can contain an address field or control register data, driven by the L2 cache memory. |
| ADS | Processor Cntl | Input | Upon assertion, the AdDress Strobe indicates to the L2 cache memory that a valid microoperation is being requested by the processor. |
| CLK | Processor Cntl | Input | Full frequency Clock sent to the L2 cache memory from the processor. |
| OP[3:0] | Processor Cntl | Input | The L2 cache memory OPeration is encoded in this field. OP is used by L2 cache memory only when ADS assserted. |
| SW[3:0] | Processor Cntl | Input | The Status Write bits are supplied by the processor on a status update operation. The processor controls the MESI status bits of each tag in the directory array |
| RESET | Processor Cntl | Input | Buffered System RESET pin. |
| WC[1:0] | Processor Cntl | Input | The Write Chunk field encodes into which write chunk buffer location the |

-continued

| NAME | CLASS | I/O | DESCRIPTION |
|---|---|---|---|
| | | | chunk data should be latched. It is used by the L2 cache memory only when WCVAL is asserted, and is otherwise undefined. |
| WCVAL | Processor Cntl | Input | The Write Chunk VALid indicates to the L2 cache memory that a data chunk is to be stored in its data line buffer register. The chunk number is specified by WC. |
| WO[1:0] | Processor Cntl | Input | The 2-bit Way Out field is an extension of the address field in that it specifies which way is being referenced by the processor in the given operation. |
| HIT | Processor Cntl | Output | HIT. Indicates status information on a line read or tag inquire. |
| WR[1:0] | Processor Cntl | Output | The Way Read field provides the processor the way number of the line that is referenced by the current micro-operation. |
| SR[3:0] | Processor Cntl | Output | The Status Read bits of a given line in the L2 cache memory is driven by the L2 cache memory. |
| AP[1:0] | Processor Integrity | Input | Two bits of Address Parity protect each entry in the L2 cache memory tag array. The address is examined for parity correctness on transmission from processor to L2 cache memory. The transmitted parity bits are stored in the tag array. The address parity is interleaved over the field, with AP[1] protecting the odd bits of A, and AP[0] protecting the even bits of A. Parity is odd. |
| DECC[7:0] | Processor Integrity | IOput | The Data Error Checking and Correcting bits are supplied with each data transfer, regardless of direction, and have the same timing as the D bits. These pins are driven with a 1 when the L2 cache memory is driving an address back to the processor. |
| OUTP | Processor Integrity | Input | OUTput Parity, sent to the L2 cache memory from the processor, calculated over Way Out, and Opcode field |
| WCPAR | Processor Integrity | Input | Write Chunk PARity, sent to L2 cache memory from the processor, calculated over the chunk number specified by WC. |
| BERR | Processor Integrity | Output | The L2 cache memory detected a Storage Error in the tag or status array, and asserts this signal to the processor. If a transmission error from the processor to the L2 cache memory is detected; the BERR signal is asserted to indicate; Transmission Error. |
| INP | Processor Integrity | Output | INput Parity, sent to the processor from the L2 cache memory, computed over the Hit/Miss, Way Read, and Storage/Transmission Error signals. |

Through the use of the above signals, the present invention allows access to the L2 cache memory by the processor. However, the L2 cache memory is able to complete the access in any manner. The processor does not need to know how the access is being completed. Because of this partitioning, any L2 cache memory may be designed for use in the computer system of the present invention. Other signals for bond control and testing, as well as for testing the processor, have been omitted to avoid obscuring the present invention.

Note that the processor die includes the control logic for generating the micro-operations and using the interface provided between the L2 cache memory die and the processor die. The processor provides a unilateral control path between the two dice, with only the bi-directional data bus as an exception. In this manner, the partitioning between the two dice allows one of the dice to include the necessary functionality to control the other die(s).

The sequence of operations that are sent to the L2 cache are controlled by the processor. This control logic can make optimal use of the L2 cache memory as it has access to the L1 cache memory, the processor requests and the system bus requests. The logic is designed to provide the highest priority to all processor accesses. These accesses use the address bus and the arrays for a short period of time but then use the data bus to read out the data chunks over four cycles. The control logic can recognize this condition and perform tag inquire instructions to operate in parallel and not require the data bus.

One Embodiment of a Computer System of the Present Invention

Figure 4:
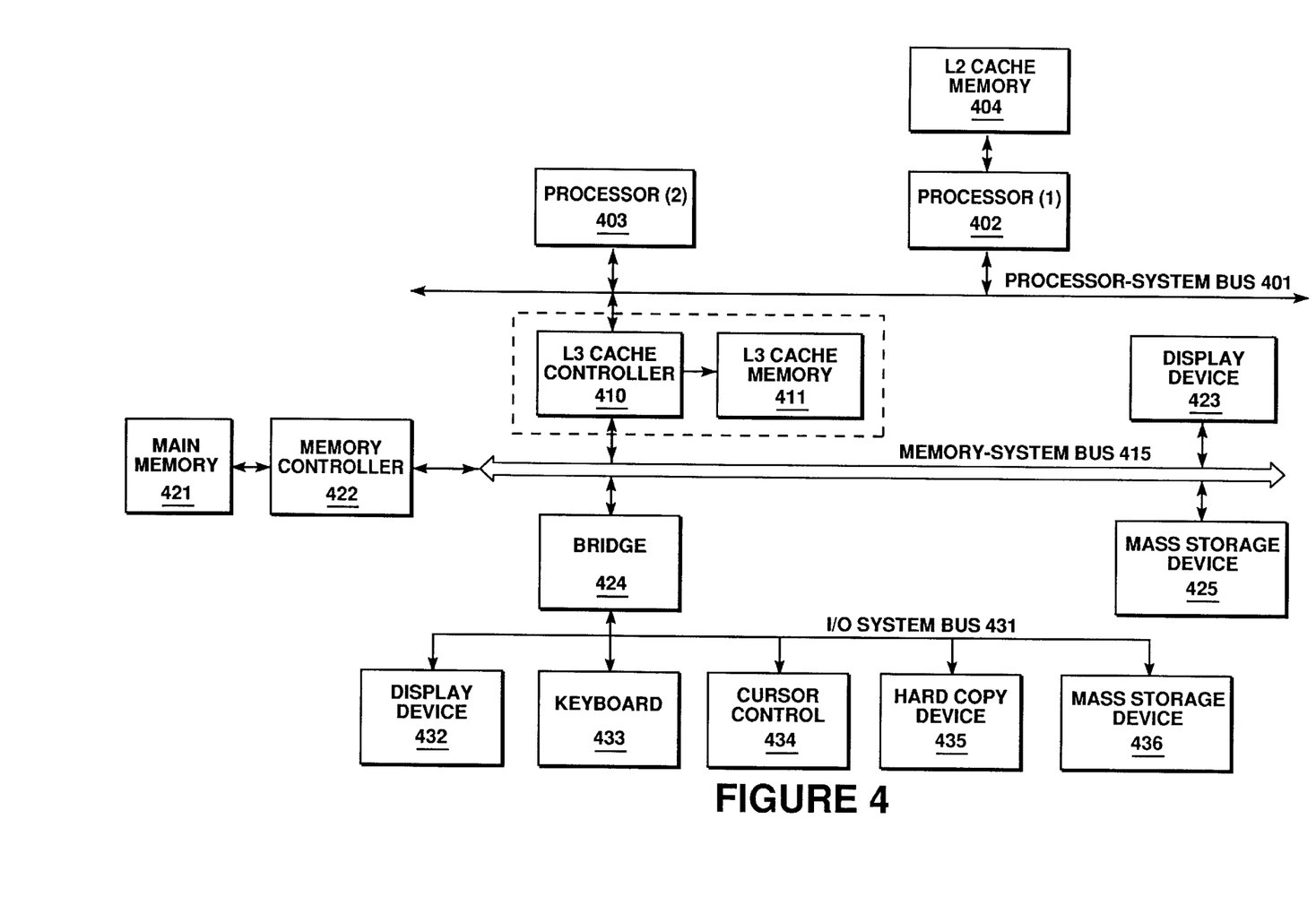
FIG. 4 is an overview of a computer system of the present invention shown in block diagram form.

The processor and the L2 cache memory in the present invention may be integrated into a computer system such as that in FIG. 4. FIG. 4 is an overview of a computer system of the present invention shown in block diagram form. It will be understood that while FIG. 4 is useful for providing an overall description of the computer system of the present invention, a number of details of the system are not shown. As necessary for disclosure of the present invention, further detail is set forth with reference to the other figures provided with this specification.

As illustrated in FIG. 4, a computer system as may be utilized by one embodiment of the present invention generally comprises a processor-system bus or other communication device 401 for communicating information and a processor 402 coupled with processor-system bus 401 for processing information. In the present invention, processor-system bus 401 includes address, data and control buses. In one implementation, the present invention includes Intel® architecture microprocessors as processors 402 and 403; however, the present invention may utilize any type of microprocessor architecture. In one embodiment of the present invention, processor 402 includes an internal cache memory, commonly referred to as a level one (L1) cache memory for temporarily storing data and instructions on-chip. A level two (L2) cache memory 404 is coupled to processor 402 for temporarily storing data and instructions for use by processor 402. In one embodiment, cache memory 404 is included in the same chip package as processor 402.

Also coupled to processor-system bus 401 is processor 403 for processing information in conjunction with processor 402. Processor 403 may comprise a parallel processor, such as a processor similar to or the same as processor 402, or may comprise a co-processor, such as a digital signal processor. A level three (L3) cache memory 411 for temporarily storing data and instructions for use by other devices in the computer system (for example, processor 402, processor 403, etc.) and a L3 cache controller 410 for controlling access to L3 cache memory 411 may also be coupled to processor-system bus 401. The L3 cache controller 410 is also coupled to memory-system bus 415.

A memory-system bus or other communication means 415 for communicating information is coupled to processor 402 for providing processor 402 and other devices in the computer system access to the memory and input/output (I/O) subsystems. A memory controller 422 is coupled with memory-system bus 415 for controlling access to a random access memory (RAM) or other dynamic storage device 421 (commonly referred to as a main memory or system memory) for storing information and instructions for processor 402 (and processor 403). A mass data storage device 425, such as a magnetic disk and disk drive, for storing information and instructions, and a display device 423, such as a cathode ray tube (CRT), liquid crystal display (LCD), etc., for displaying information to the computer user are coupled to memory-system bus 415.

An input/output (I/O) bridge 424 is coupled to memory-system bus 415 and I/O bus 431 to provide a communication path or gateway for devices on either memory-system bus 415 or I/O bus 431 to access or transfer data between devices on the other bus. Specifically, bridge 424 turns the byte/word/dword data transfer traffic from I/O bus 431 into line size traffic on memory-system bus 415.

I/O bus 431 communicates information between devices in the computer system. Devices that may be coupled to system bus 431 include a display device 432, such as a cathode ray tube, liquid crystal display, etc., an alphanumeric input device 433 including alphanumeric and other keys, etc., for communicating information and command selections to other devices in the computer system (for example, processor 402) and a cursor control device 434 for controlling cursor movement. Moreover, a hard copy device 435, such as a plotter or printer, for providing a visual representation of the computer images and a mass storage device 436, such as a magnetic disk and disk drive, for storing information and instructions may also be coupled to system bus 431.

Of course, certain implementations and uses of the present invention may not require nor include all of the above components. For example, in certain implementations, the L3 cache controller and L3 cache memory may not be required. In such implementations processors 402 and 403 will reside directly on a memory system bus 415. In other implementations, it may not be required to provide a display device for displaying information. In addition, certain implementations of the present invention may include other components.

Figure 5A:
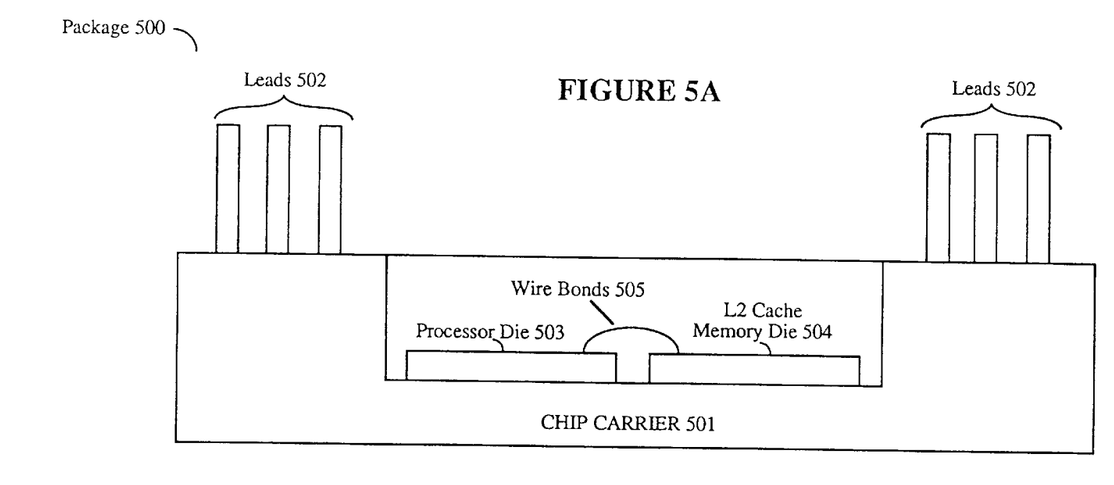
FIGS. 5A, 5B, 5C, and 5D illustrate embodiments of an integrated circuit package containing multiple integrated circuit dice according to the present invention.

In one embodiment, the L2 cache memory and the processor of the present invention are contained within the same integrated circuit package. FIG. 5A illustrates a section view of one embodiment of the dual die package of the present invention. Referring to FIG. 5A, package 500 includes chip carrier 501 for encapsulating and protecting multiple integrated circuit (IC) dice, leads or pins 502 for electrically coupling dice in package 500 to the circuit board (not shown), wirebond 505, processor die 503 and L2 cache memory die 504. The coupling between the circuit board and package 500 has not been shown to avoid obscuring the present invention. Die 503 is also coupled to leads 502, such that electrical signals may be transferred from die 503 (and die 504) to off-chip (i.e., to the printed wiring board). In one embodiment, die 503 is wire bonded to leads 502 of package 500 in a manner well-known to those skilled in the art. Although only six leads are shown, the actual number of leads for the package is generally much larger, numbering in the hundreds.

The leads 502 and the chip carrier 501 are comprised of materials standard in the art. For instance, leads 502 may comprise copper leads. Similarly, chip carrier 501 may be a ceramic carrier, a plastic carrier or other material suitable for encasing the multiple dice of package 500.

In one embodiment, processor die 503 and L2 cache memory die 504 are integrated circuits fabricated using well-known metal-oxide semiconductor (MOS) techniques. Although only die 503 and die 504 are shown, other embodiments may include more than two dice integrated into the same package. Processor die 503 and cache memory die 504 are electrically coupled to each other by wirebond 505. Moreover, die 503 and die 504 are coupled to chip carrier 501 using, for example, adhesive, such a epoxy.

Figure 5B:
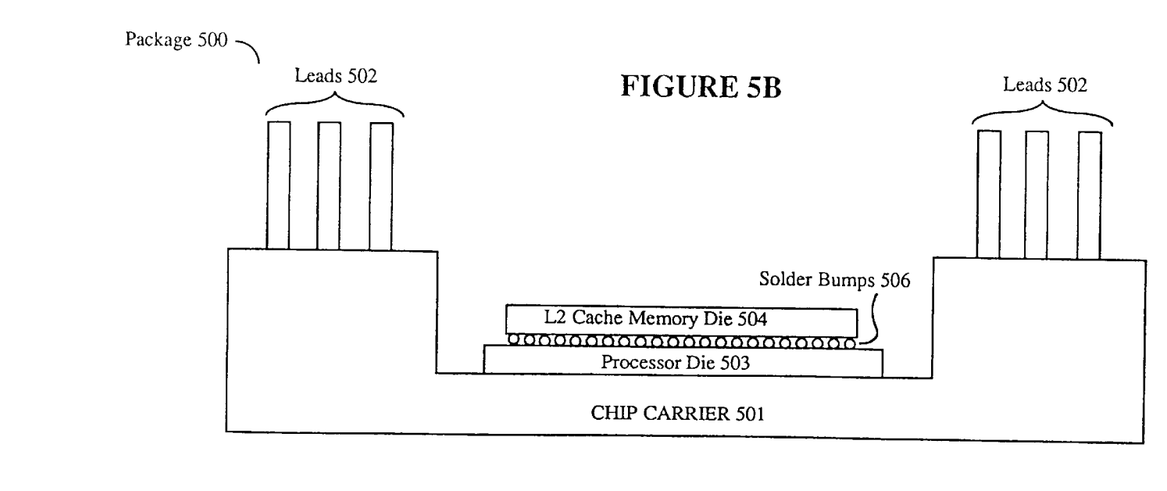
Figure 5C:
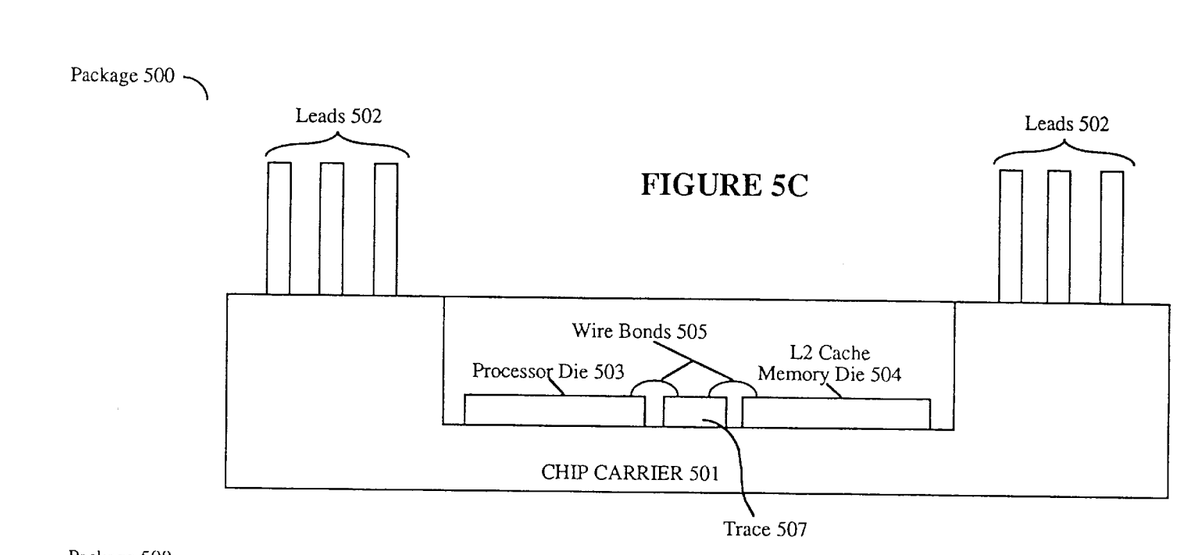
Figure 5D:
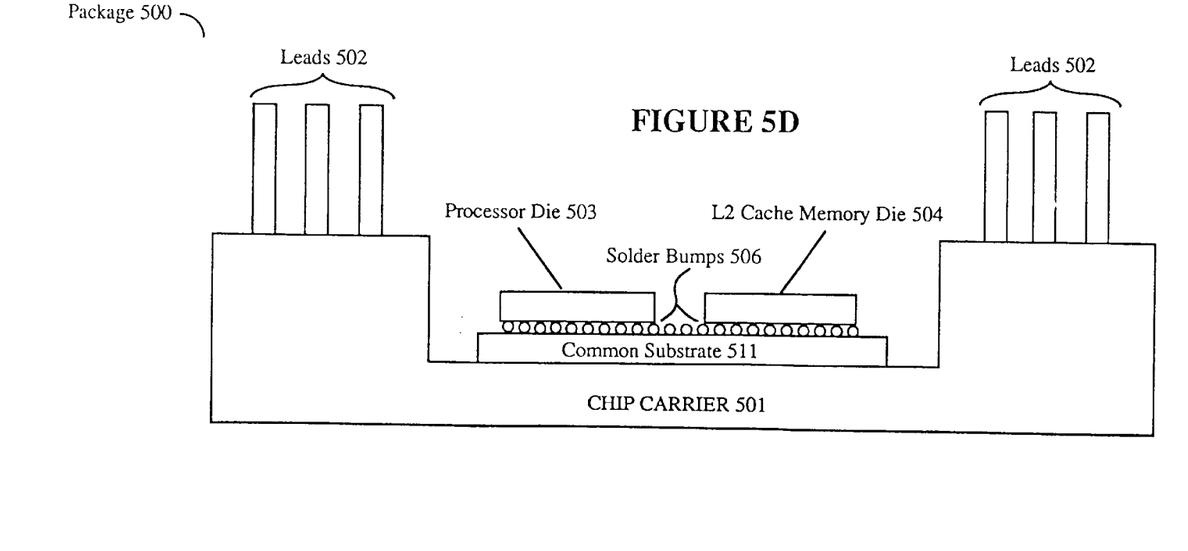

Die 503 and die 504 may be electrically coupled to each other in numerous other ways. In one embodiment, L2 cache memory die 504 is coupled directly on top of die 503 using solder bumps (e.g., solder bumps 506) in a flip-chip type configuration, such as shown in FIG. 5B. Processor die 503 and L2 cache memory die 504 may be coupled to a trace 507 using wirebonds 509, such as shown in FIG. 5C. In this case, trace 507 acts as part of the electrical connection between the dice. In yet another embodiment, die 503 and die 504 may be solder bumped to a common silicon substrate 511 using solder bumps 510 as shown in FIG. 5D. In this case, silicon substrate 511 provides a communication path between the dice.

Thus, the present invention as described above provides efficient replacement line identification. Addresses of requests can be continuously input to the cache memory without concern for the cache memory trying to return an address on the same bus. In addition, the replacement line address is returned to the cache controller concurrent with the cache miss indication. Thus, an additional request from the controller for the replacement line identification is not required.

It will be appreciated that although the descriptions above describe the cache memory as being an L2 cache memory, other cache memories are within the spirit and scope of the present invention. For example, the replacement line identification of the present invention may be employed in a level-1 cache memory, or a level-3 cache memory.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims, which in themselves recite only those features regarded as essential to the invention.

Thus, a method and apparatus for cache memory replacement line identification has been described.

What is claimed is:

1. A cache memory subsystem comprising:
   a data array which contains a plurality of cache lines in a plurality of sets, wherein each set of the plurality of sets corresponds to a plurality of ways;
   a tag array which contains a plurality of identifiers corresponding to the plurality of cache lines; and
   a control logic coupled to the data array and the tag array, wherein the control logic is operative to compare a request for a cache line received by the memory subsystem to the tag array to determine whether the request hits or misses the cache memory, wherein the control logic is also operative to issue a hit signal on a status bus and concurrently begin transferring the requested cache line on a data bus in response to a request which hits the cache memory, and wherein the control logic is also operative to issue a miss signal on the status bus and concurrently transfer a replacement line address on the data bus in response to a request which misses the cache memory.

2. The cache memory subsystem of claim 1, further comprising a least recently used (LRU) array which contains a plurality of identifiers, wherein each of the plurality of identifiers indicates a replacement line address for a corresponding set.

3. The cache memory subsystem of claim 1, wherein the LRU array utilizes a pseudo least recently used process for determining the replacement line address for each of the plurality of sets.

4. The cache memory subsystem of claim 1, further comprising cache memory control logic coupled to the cache memory.

5. An interface between a cache memory and cache memory control logic comprising:
   an address bus which transfers a requested address from the cache memory control logic to the cache memory;
   a control bus which transfers control information associated with the requested address from the cache memory control logic to the cache memory,
   a status bus which transfers status information associated with the requested address from the cache memory to the cache memory control logic, wherein the status information includes an indication of whether the requested address hit or missed the cache memory;
   a bi-directional data bus which transfers data associated with the requested address from the cache memory control logic to the cache memory, and transfers a replacement line address from the cache memory to the cache memory control logic; and
   wherein the replacement line address is transferred on the bi-directional data bus concurrently with the transfer on the status bus of the indication of the cache memory miss.

6. The interface of claim 5, wherein the address bus is a uni-directional bus.

7. The interface of claim 5, wherein the data bus also transfers cache line data associated with the requested address from the cache memory to the cache memory controller in the event of a cache hit.

8. A method for responding to a request from a requesting agent for a cache line in a cache memory, the method comprising the steps of:
   (a) determining whether the cache line is contained in the cache memory;
   (b) issuing a signal to the requesting agent indicating whether the cache line is contained in the cache memory; and
   (c) initiating transfer of the requested cache line to the requesting agent over a data bus provided the requested cache line is contained in the cache memory, otherwise initiating transfer of a replacement line address to the requesting agent over the data bus, wherein the step of initiating is performed concurrently with the step of issuing.

9. The method of claim 8, wherein the step (b) comprises issuing the signal on a status bus.

10. The method of claim 8, wherein step (c) comprises initiating transfer of the replacement line address and issuing the signal indicating whether the cache line is contained in cache memory simultaneously in a single clock cycle.

11. A method for identifying for a requesting agent a replacement cache line address in a cache memory when a requested cache line is not contained within the cache memory, the method comprising the steps of:

(a) determining the replacement cache line address;

(b) issuing a status signal to the requesting agent indicating the requested cache line is not contained in the cache memory; and (c) initiating transfer of the replacement cache line address to the requesting agent concurrently with issuing the status signal.

12. The cache memory subsystem of claim 1, further comprising an address bus, coupled to the control logic, for transferring cache memory subsystem address information.

13. The cache memory subsystem of claim 12, wherein the address bus is a unidirectional address bus.

14. A computer system having a cache memory subsystem, the computer system comprising:

a data array which contains a plurality of cache lines in a plurality of sets, wherein each set of the plurality of sets corresponds to a plurality of ways;

a tag array which contains a plurality of identifiers corresponding to the plurality of cache lines;

a least recently used (LRU) array which contains a plurality of identifiers, wherein each of the identifiers represents a replacement line address for a corresponding set; and a control logic, coupled to the data array, tag array and the LRU array, wherein the control logic is operative to compare a request for a cache line to the tag array to determine whether the request hits or misses the cache memory, and wherein the control logic is operative to issue a hit signal on a status bus and concurrently begin transferring the cache line to the data bus when the request hits the cache memory, and wherein the control logic is operative to issue a miss signal on the status bus and concurrently transfer a replacement line address from the LRU to the data bus when the request misses the cache memory.

15. The computer system of claim 14, wherein the LRU utilizes a pseudo least recently used process to determine the replacement line address for each of the plurality of sets.

16. The computer system of claim 15, wherein the hit signal is issued on the status bus concurrently with the transfer of the cache line address to the data bus within a single clock cycle.

* * * * *